United States Patent [19]

Cox, Jr.

[11] 4,249,617

[45] Feb. 10, 1981

[54] PORTABLE ONE-HAND OPERATED ROTARY TORQUE PRODUCING TOOL

[76] Inventor: James D. Cox, Jr., 7420 Birkdale Dr., Newark, Calif. 94560

[21] Appl. No.: 86,732

[22] Filed: Oct. 22, 1979

[51] Int. Cl.$^{3}$ ........................ B23B 45/00; B27C 3/08

[52] U.S. Cl. ........................ 173/170; 74/128; 81/57.39

[58] Field of Search ................ 173/170, 18; 81/57.39; 16/110; 74/128, 142

[56] References Cited

U.S. PATENT DOCUMENTS

| | | | |
|---|---|---|---|
| 1,391,619 | 9/1921 | Edwinson | 81/57.39 X |
| 2,708,345 | 5/1955 | Miles | 60/54 |
| 2,708,581 | 5/1955 | Barnes | 74/128 X |
| 2,726,563 | 12/1955 | Blackburn | 81/58.1 |
| 3,286,560 | 11/1966 | Murray | 81/58.1 |
| 3,557,644 | 1/1971 | Gregory | 81/57.39 |
| 3,616,714 | 11/1971 | Gregory | 81/57.39 |
| 3,941,017 | 3/1976 | Lenker et al. | 81/57.39 |
| 4,108,027 | 8/1978 | Lenker | 81/57.39 X |
| 4,141,262 | 2/1979 | Smith | 81/57.39 |

*Primary Examiner*—Ronald Feldbaum

*Attorney, Agent, or Firm*—Manfred M. Warren; Robert B. Chickering; Glen R. Grunewald

[57] ABSTRACT

A rotary torque producing tool having a pistol grip handle with a manually grippable and displaceable part, a rotary tool operating shaft, clutch members mounted for rotation in surrounding relation to the shaft and being operatively connected to the displaceable handle part for rotation of the clutch members upon gripping of the handle and part, the drive means providing rotation of the clutch members in opposite directions about the shaft upon gripping displacement of the handle part, and means selectively engaging the clutch members and shaft for obtaining optional direction of rotation of the shaft. The drive structure includes a barrel member mounted for longitudinal reciprocation coaxially of the shaft and being formed with a pair of reversely configured spiral cams which are operatively connected by cam followers to the clutch members. The clutch members are formed to provide unidirectional driving connections to the shaft, i.e. a locked driving connection upon rotation of the clutch members in one direction and a detached free movement upon rotation of the clutch members in a reverse direction.

10 Claims, 9 Drawing Figures

PORTABLE ONE-HAND OPERATED ROTARY TORQUE PRODUCING TOOL

BACKGROUND OF THE INVENTION

1. Field of Invention

The invention relates to screwdrivers, wrenches and the like adapted for driving threaded parts such as screws, nuts, etc., and more particularly to tools of this character which are adapted for one-hand operation.

2. Description of Prior Art

The inventor is familiar with the following prior art which constitutes the most pertinent art known to him, U.S. Pat. Nos. 1,391,619; 2,708,345; 2,726,563; 3,286,560; 3,557,644; 3,616,714; 3,941,017; 4,018,027; and 4,141,262.

SUMMARY OF THE INVENTION

The device of the present invention is a portable hand tool for tightening or loosening screws, bolts, nuts, etc. in a simple, direct, one-handed operation. It is designed for use primarily on jobs that are repetitious such as in aircraft or trailer assembly where large numbers of screws or nuts are to be fastened. The principal feature of the present tool is its ability to effect rotational displacement of the fastener, rapidly and easily by a simple one-hand squeeze action on the handle of the tool.

Other features of advantage of the present tool include its extreme ease and simplicity of use; design permitting manufacture at modest cost; and ruggedness of construction capable of withstanding hard and continuous use as in assembly or maintenance of plants over a long and trouble-free life.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 1:
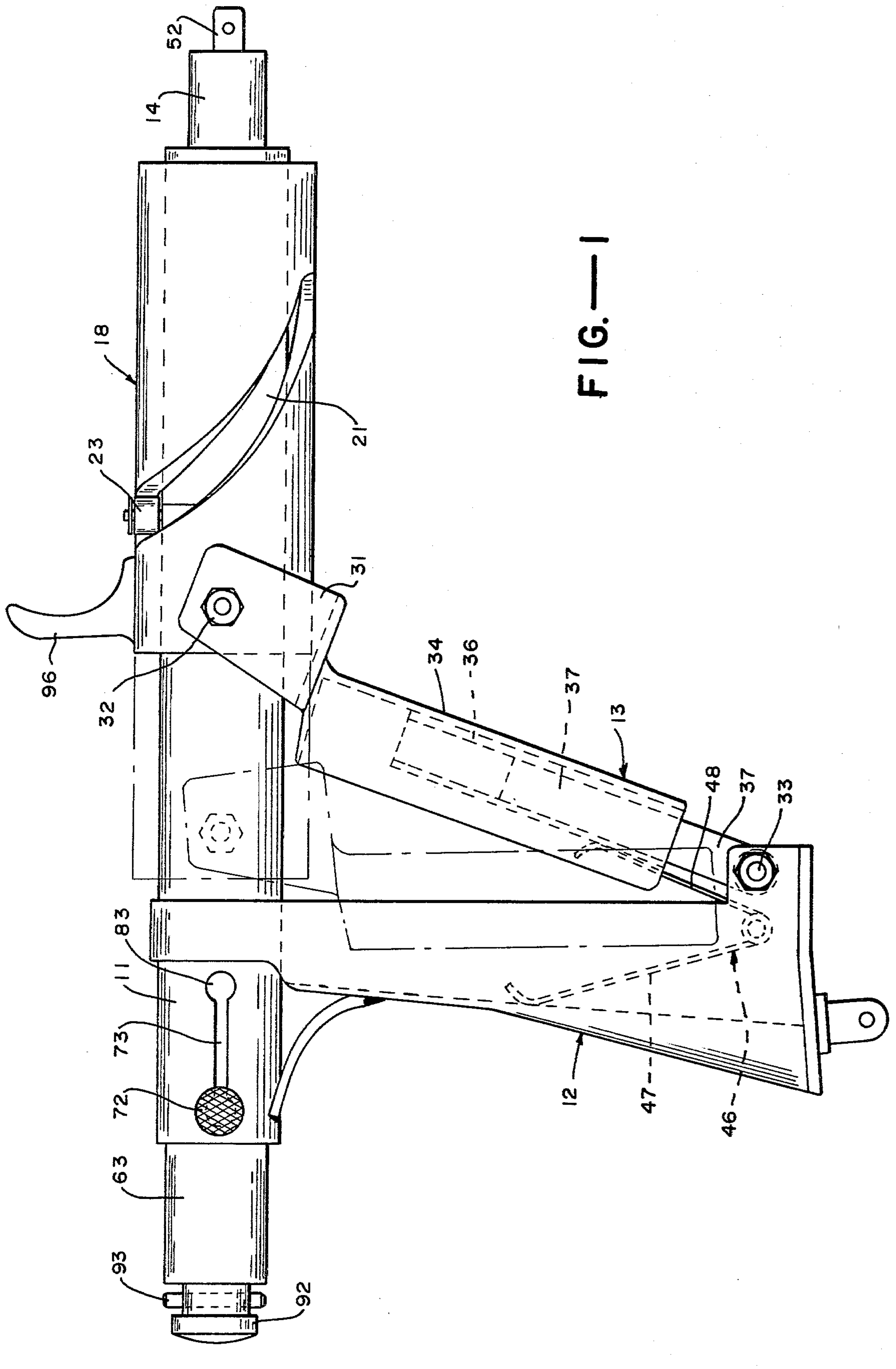
FIG. 1 is a side elevation of a tool constructed in accordance with the present invention.

The rotary torque producing tool of the present invention comprises, briefly, a housing 11 having a pistol grip handle 12 with a manually grippable and displaceable part 13; a tool operating shaft 14 mounted for rotation in housing 11; clutch members 16 and 17 carried by the housing for rotation in surrounding relation to shaft 14; drive means 18 connecting members 16 and 17 and part 13 and providing rotation of the clutch members in opposite directions about shaft 14 upon gripping displacement of handle 12 and part 13; and means 19 selectively engaging the clutch members and shaft for obtaining optional direction of rotation of the shaft.

Figure 2:
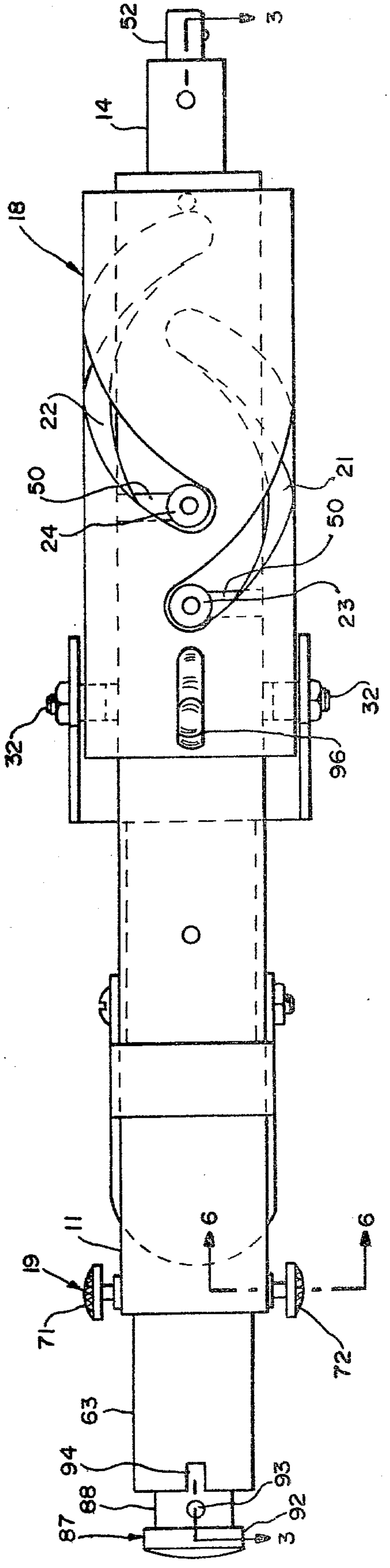
FIG. 2 is a top plan view of the tool.

Drive means 18 here comprises an elongated cam member carried by the housing for longitudinal reciprocation and being formed with a pair of reversely configured spiral cams 21 and 22, see FIGS. 1 and 2. Cam member 18 is here connected to part 13 to effect its reciprocation upon displacement of part 13 between expanded and contracted gripping positions. Cam followers 23 and 24 are connected to clutch members 16 and 17, see FIG. 3, and are engaged with cams 21 and 22. As here shown, cam member 18 comprises a cylindrical barrel mounted on housing 11 in coaxial relation around shaft 14 and is formed with spiral slots through the side wall of the barrel providing cams 21 and 22. The followers here comprise studs 26 and 27 mounted on and extending radially from the clutch members 16 and 17 and are fitted with rollers 28 and 29 which are confined in the spiral cam slots for rolling contact with the walls thereof.

Figure 7:
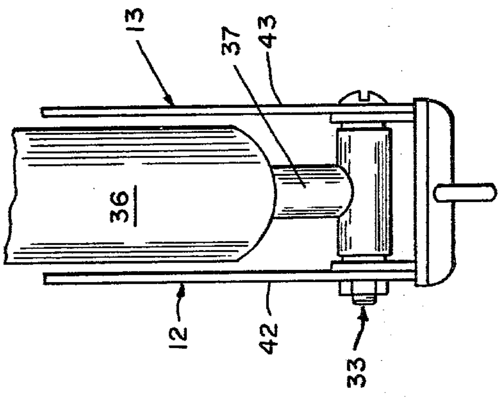
FIG. 7 is a fragmentary elevation of a portion of the operating handle.
Figure 8:
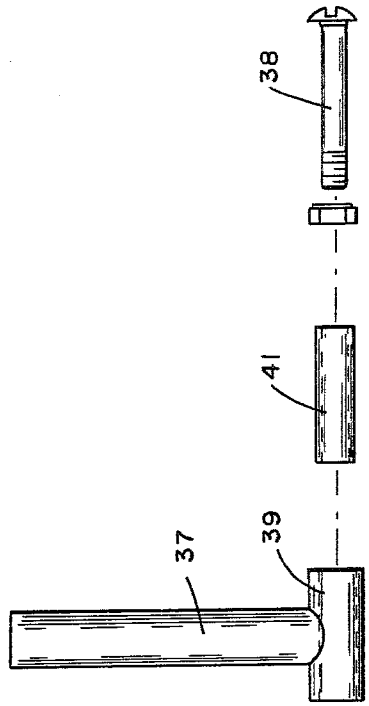
FIG. 8 is an exploded view of parts of the handle.
Figure 9:
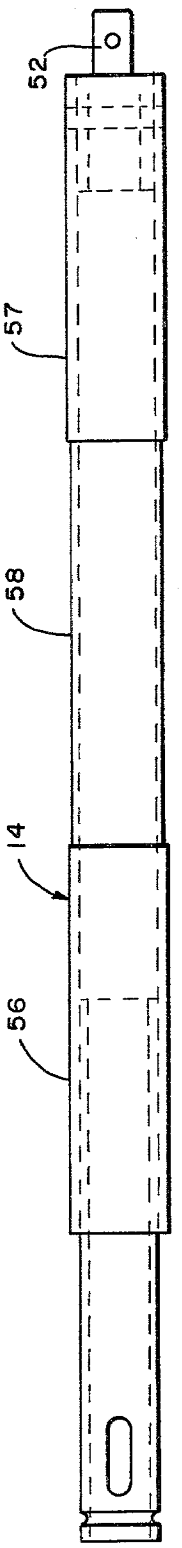
FIG. 9 is a side elevation of the tool operating shaft.

Part 13 here consists of an expandable lever having a yoke 31 at its normally upper end having a pivotal attachment 32 to the proximal end of barrel 18; and a pivotal connection 33 at its normally lower end to handle 12. Part 13 is constructed with a semi-circular shield 34 which provides a broad hand supporting area and which carries a bushing or cylinder 36 in which there is mounted for longitudinal reciprocation a piston-like guide 37 which has its lower end secured by bolt 38 to form the lower pivotal connection 33, see FIGS. 1, 7 and 8. As will be best seen in FIG. 8, piston guide 37 is formed with a tubular lower end 39 which receives a bushing 41 which, in turn, journals bolt 38 which is secured between flanged parts 42 and 43 at the lower end of handle 12. A spring 46 is carried by handle 12, see FIG. 1, and has opposed legs 47 and 48 bearing on the handle and part 13 biasing the latter to an expanded gripping position, part 13 being manually displaceable against the urge of spring 46 to a contracted gripping position displacing drive member 18 proximally of the tool as indicated in phantom line in FIG. 1. Upon relaxation of the grip, spring 46 will return part 13 to its expanded gripping position and at the same time cause member 18 to move toward the distal end of the tool.

Figure 3:
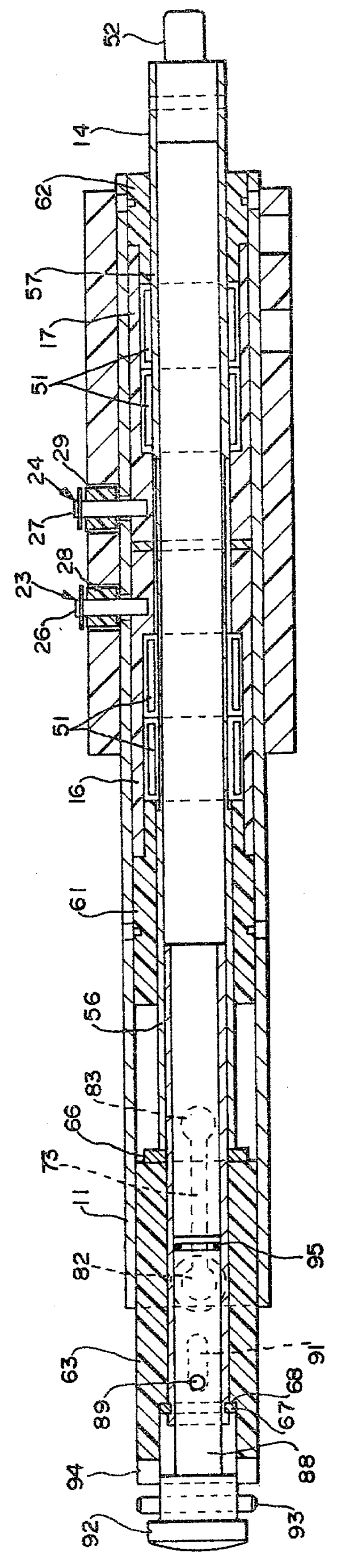
FIG. 3 is a cross sectional view of the tool taken substantially on the plane of line 3—3 of FIG. 2.

As an important feature of the present invention, the clutch members 16 and 17 are formed to provide a locked driving connection to shaft 14 upon rotation of the clutch members in one direction and to free the shaft for detached relative movement upon rotation of the clutch members in a reverse direction. Various forms of unidirectional drive, overriding-type, clutches may be used. A preferred clutch is one made by The Torrington Company, Torrington, Connecticut, and is fitted with clutch rollers 51 providing unidirectional driving connections with shaft 14, the rollers running free when relative rotation between the shaft and clutch housing is in one direction, and locking up and providing a driving connection between the housing and shaft when rotation of the clutch housings is in the opposite direction. As above noted, and as will be seen in FIG. 2, the cam slots 21 and 22 are reversely configured so that upon displacement of the cam barrel 18 proximally of the tool by gripping of the handle parts, clutch housing 16 will rotate clockwise and clutch housing 17 will rotate counterclockwise as viewed from the proximal end of the tool. In the present construction, clutch housing 16 will provide a driving connection to shaft 14 upon rotation of the clutch housing in a clockwise direction and will freely permit independent rotation of shaft 14 upon rotation of the housing in a counterclockwise direction. In an opposite manner, clutch housing 17 and its rollers are arranged to provide a drive to shaft 14 when the housing is rotated in a counterclockwise direction and to permit free independent rotation of shaft 14 when the housing is rotated in a clockwise direction, all directions being viewed from the proximal end of the tool. Accordingly, there is provided means for selectively enabling clutches 16 and 17 so that the operator may selectively drive the distal tool supporting end 52 in either clockwise or counterclockwise direction. As here shown, this is accomplished by providing shaft 14 with longitudinally spaced portions 56 and 57 which have diameters formed for rolling contact with clutch rollers 51 to provide the unidirectional driving action above described. Intermediate portions 56 and 57, shaft 14 is formed with a length 58 of reduced diameter providing when positioned in registration with clutch rollers 51 free relative movement of the shaft in both directions of rotation of the clutch members. Thus, shaft 14 may be longitudinally displaced to position portion 56 in registration with clutch housing 16 and reduced portion 58 in registration with clutch housing 17. In this position of the shaft it will be driven in a clockwise direction upon contraction of the handle parts, and on return movement of the drive, clutch housing 16 will rotate freely in a counterclockwise direction to its normal rest position, as seen in FIG. 2, thus leaving shaft 14 stationary during the return movement. The next contraction of the handle parts will cause shaft 14 to again advance in a clockwise direction and this operation may be repeated easily and at high frequency by the operator simply contracting and expanding his grip on the tool handle. During this operation, clutch housing 17 is inoperative due to its registration with the reduced shaft portion 58. Reverse driving of shaft 14 may be simply effected by moving the shaft proximally of the tool so as to position shaft portion 57 in registration with clutch housing 17 and the reduced shaft length 58 in registration with clutch housing 16. This position is illustrated in FIG. 3. With the parts in such position, contraction of the handle will cause counterclockwise rotation of the shaft and on relaxing of the grip, the parts will return to their rest position, while shaft 14 remains stationary. In both instances, the return movement of the clutch housings to rest position is accomplished without perceptible drag on the shaft. This advantage is of considerable importance when driving a relatively free-running screw or nut and where it is a common experience with ratchet wrenches that the part being driven will be dragged back during the return positioning of the ratchet parts. In the present tool, even a relatively free-running nut or the like will remain stationary during the return movement of the clutch housings thus providing a full length advance of the driven part on each cycle of operation of the tool.

Figure 4:
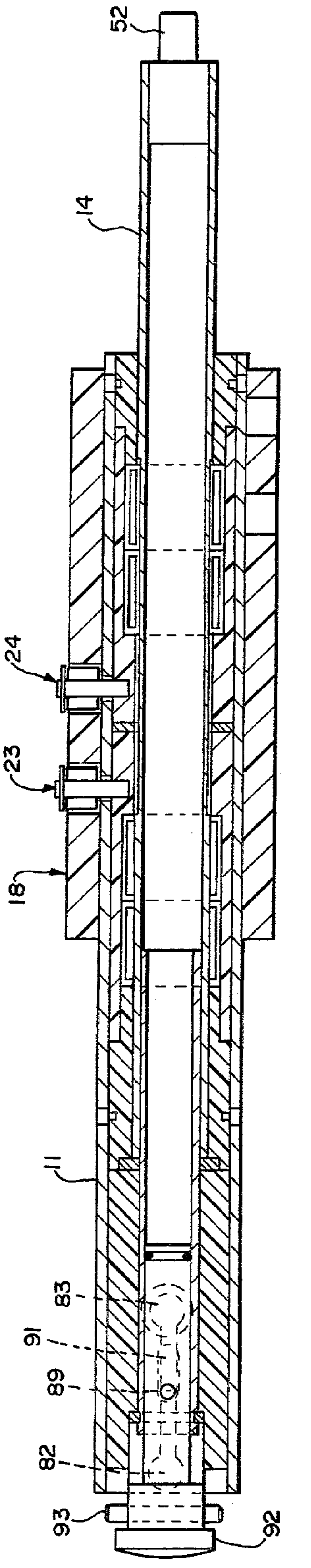
FIG. 4 is a cross sectional view similar to FIG. 3 but showing the parts in a different position.
Figure 6:
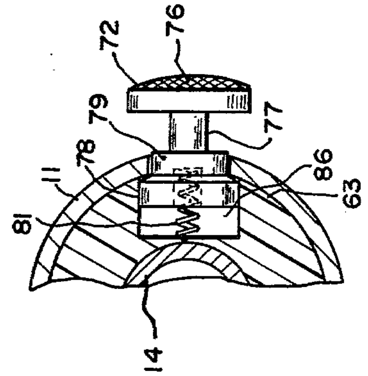
FIG. 6 is a fragmentary cross sectional view taken substantially on the plane of line 6—6 of FIG. 2.

Means 19 is here provided to afford the above-described longitudinal displacement of shaft 14 to provide the optional directional drive above described. As here shown, shaft 14 is mounted for rotation in bearings 61 and 62, see FIGS. 3–5, and at the same time may slide longitudinally within these bearings. An actuating member, here in the form of a sleeve or bushing 63 is mounted for longitudinal reciprocation within the proximal end of housing 11 and is secured for joint reciprocation with shaft 14 by a shoulder 66 on the shaft engaging the distal end of bushing 63 and a keeper washer 67 on the shaft engaging a shoulder 68 on bushing 63. Longitudinal displacement of bushing 63, and, accordingly, shaft 14, is here effected by a pair of manually engageable push pins 71 and 72 positioned on the opposite sides of housing 11, see FIG. 2, and which are connected to bushing 63, see FIG. 6, and extend through longitudinally extending slots 73 in the housing for external manual engagement. With reference to FIG. 6, it will be noted that each of the push pins 71–72 is formed with an enlarged head 76 for manual engagement, a reduced stem 77 and an enlarged interior part 78 having a somewhat reduced portion 79, and a spring 81 mounted between shaft 14 and part 78 urging the outward extension of the pin. Slots 73 are formed with enlargements 82 and 83 at their opposite ends which are dimensioned to snugly receive pin portion 79 with the enlarged part 78 engaging the interior wall of the housing. In this position of the parts, see FIG. 6, bushing 63 and shaft 14 are locked in one of their longitudinal terminal positions. To change the longitudinal position of the shaft, pin 71–72 is pushed inwardly, moving enlarged portions 78 and 79 into a receiving chamber 86 in the bushing and registering stem 77 with the slot 73 for longitudinal movement therethrough, it being noted that the diameter of stem 77 is slightly less than the width of slot 73. With the shaft moved distally, to the right as seen in FIG. 3, clutch housing 16 will be enabled and clutch housing 17 will be disengaged so as to provide for a clockwise direction of rotation of shaft 14. Upon movement of the shaft to its proximal, aft position, clutch housing 17 will be enabled and clutch housing 16 will be disengaged so as to provide a counterclockwise direction of movement of shaft 14.

Figure 5:
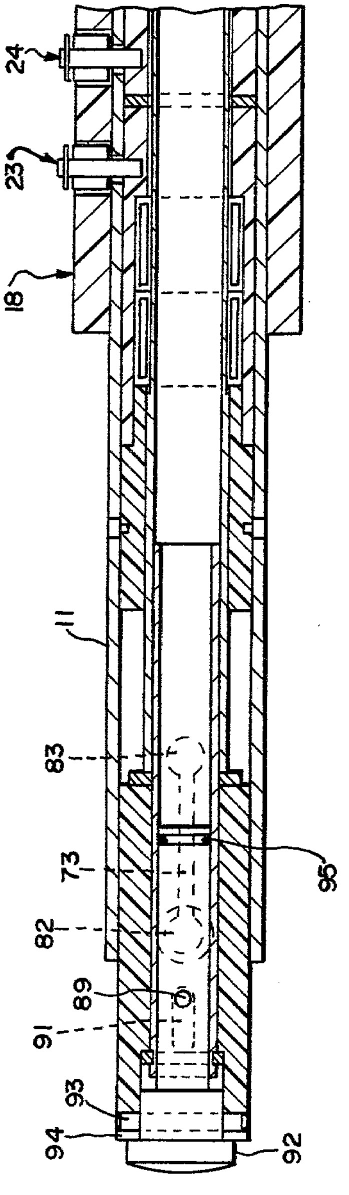
FIG. 5 is a fragmentary cross sectional view similar to FIGS. 3 and 4 but showing an additional change in position of one of the parts.

As an important feature of the present invention, means 87 is provided for selectively locking shaft 14 and housing 11 for high torque applications provided by levered rotary displacement of handle 12 about the axis of shaft 14. This operation is most useful in applying the final tightening action to screws, nuts, or the like, or in breaking them loose for removal. As here shown, there is mounted for longitudinal displacement in the proximal end of shaft 14, a plunger 88 which is locked to the shaft against relative rotation by pins 89 on opposite sides of the plunger engaging through longitudinally extending slots 91 in the shaft. Plunger 88 extends externally from bushing 63 and is provided with an enlarged head 92 for manual engagement and with a cross pin 93 which is engageable in diametrically opposed pin-receiving slots or sockets 94 in the proximal end face of bushing 63. The structure, as described, enables the operator to push plunger 88 longitudinally into bushing 63, moving pin 93 into slots 94 so as to interlock plunger 88, shaft 14 and bushing 63 against relative rotation. Bushing 63 is, in turn, interlocked against rotation in housing 11 by push pins 71 and, accordingly, in the inserted position of plunger 88 as shown in FIG. 5, the shaft and housing are interlocked against relative rotation. In this position the operator can exert a large amount of torque to the shaft through the levering action of the handle applied to the housing and the shaft. An O-ring 95 fitted at the distal end of plunger 88 is arranged to bear against the interior wall of the shaft so as to firm up the movement of the plunger into and out of the shaft and to hold the position of the plunger when displaced to one of its terminal positions.

In some instances, it is desirable to obtain a second-hand manual assist in the operation of the tool so as to conveniently apply additional torque to the shaft. For this purpose, a manually engageable handle is here mounted on the drive barrel 18 for a direct application of a manually applied longitudinal displacing force. For example, with the tool handle engaged in the right hand of the user for manually gripping the handle and part 13, the user may conveniently apply his left hand to handle 96 to assist in the axial displacement of the cam barrel, thus supplementing the torque applied to shaft 14.

What is claimed is:

1. A rotary torque producing tool comprising:
a housing having a pistol grip handle with a manually grippable and displaceable part;
a tool operating shaft mounted for rotation in said housing;
clutch members carried by said housing for rotation in surrounding relation to said shaft;
drive means connecting said members and part and providing rotation of said members in opposite directions about said shaft upon gripping displacement of said part; and
means selectively engaging said members and shaft for obtaining optional direction of rotation of said shaft.

2. The tool of claim 1,
spring means biasing said part to an expanded gripping position, said part being manually displaceable to a contracted gripping position and upon release being displaced by said spring means in a return movement to expanded gripping position; and
said selectively engaging means automatically disengaging the engaged member and shaft upon and during said return movement.

3. The tool of claim 2,
said drive means comprising an elongated cam member carried by said housing for longitudinal reciprocation and being formed with a pair of reversely configured spiral cams, said cam member being connected to said part for reciprocation of said cam member upon displacement of said part between expanded and contracted gripping positions; and
cam followers connected to said clutch members and engaged with said cams.

4. The tool of claim 3,
said cam member comprising a cylindrical barrel mounted on said housing in coaxial relation around said shaft and being formed with spiral slots through the side wall of said barrel providing said cams; and
said followers comprising studs mounted on and extended radially from said members and rollers mounted on said studs and confined in said slots for rolling contact with the walls thereof.

5. The tool of claim 4,
said part comparising an expandable lever hinged at its opposite ends to said handle and barrel.

6. The tool of claim 1,
said handle extending transversely to said shaft; and
means selectively locking said shaft and housing for high torque applications provided by levered rotary displacement of said handle about the axis of said shaft.

7. The tool of claim 3, and a manually engageable handle mounted on said cam member and providing manual assistance to said part in effecting longitudinal displacement of said cam member.

8. The tool of claim 1, said clutch members being formed to provide a locked driving connection to said shaft upon rotation of said clutch members in one direction and to free said shaft for detached relative movement upon rotation of said clutch members in a reverse direction.

9. The tool of claim 8,
said shaft having longitudinally spaced portions formed for interlocking action with said clutch members; and
said last-named means providing longitudinal displacement of said shaft to position said portions into and out of interlocking action with said clutch members.

10. The tool of claim 9,
said clutch members being mounted in longitudinally spaced relation and having clutch rollers providing unidirectional driving connections to said portions; and
said shaft having a length of reduced diameter between said portions and providing when positioned in registration with said rollers detached free relative movement of said shaft in both directions of rotation of said clutch members.

* * * * *